United States Patent
Duhon et al.

(10) Patent No.: US 10,221,978 B2
(45) Date of Patent: Mar. 5, 2019

(54) AUTOMOBILE AIR HOSE ASSEMBLY WITH A ONE-WAY QUICK SNAP COUPLING

(71) Applicants: Thomas K Duhon, Ortonville, MI (US); Mark A Claeys, Oakland Township, MI (US)

(72) Inventors: Thomas K Duhon, Ortonville, MI (US); Mark A Claeys, Oakland Township, MI (US)

(73) Assignee: FCA US LLC, Auburn Hills, MI (US)

( * ) Notice: Subject to any disclaimer, the term of this patent is extended or adjusted under 35 U.S.C. 154(b) by 55 days.

(21) Appl. No.: 15/386,562

(22) Filed: Dec. 21, 2016

(65) Prior Publication Data

US 2018/0172193 A1    Jun. 21, 2018

(51) Int. Cl.
  *F16L 37/091*  (2006.01)
  *F02M 35/00*  (2006.01)
  *F16L 41/00*  (2006.01)

(52) U.S. Cl.
  CPC ............ *F16L 37/091* (2013.01); *F02M 35/00* (2013.01); *F16L 41/008* (2013.01)

(58) Field of Classification Search
  CPC ... F16L 37/091; F16L 37/0925; F16L 41/088; F02M 35/00
  USPC ......... 285/105, 129.1, 307, 321, 331, 332.2, 285/340, 374, 375
  See application file for complete search history.

(56) References Cited

U.S. PATENT DOCUMENTS

| | | | |
|---|---|---|---|
| 3,719,375 A * | 3/1973 | Nordin | 285/374 X |
| 4,005,884 A * | 2/1977 | Drori | F16L 37/0925 285/105 X |
| 4,691,943 A | 9/1987 | DeLand et al. | |
| 5,649,723 A | 7/1997 | Larsson | |
| 7,032,933 B2 * | 4/2006 | Hellman | 285/105 |
| 7,484,988 B2 | 2/2009 | Ma et al. | |
| 7,918,486 B2 * | 4/2011 | Preisendorfer | F16L 41/088 285/332.2 X |
| 2012/0104744 A1 | 5/2012 | Petty | |
| 2012/0108098 A1 | 5/2012 | Burris et al. | |

\* cited by examiner

*Primary Examiner* — Greg Binda
*Assistant Examiner* — Zachary T Dragicevich
(74) *Attorney, Agent, or Firm* — Ralph E. Smith

(57) ABSTRACT

A one-way quick snap coupling includes a female annular collar including a plurality of retention lugs resiliently extending therefrom. Each retention lug has a plurality of interior one-way retention teeth. A male annular collar is receivable within the female annular collar and the male annular collar includes a plurality of exterior one-way retention teeth. The interior and exterior one-way retention teeth have cooperating leading surfaces that are angled to engage and slide past each other in an insertion direction. In addition, the interior and exterior one-way retention teeth have cooperating trailing surfaces that are angled to engage each other in a removal direction and prevent the sensor housing from being uncoupled from the air hose without damaging the one-way quick snap coupling.

8 Claims, 5 Drawing Sheets

AUTOMOBILE AIR HOSE ASSEMBLY WITH A ONE-WAY QUICK SNAP COUPLING

FIELD

The present disclosure relates to an automobile air hose assembly with a one-way quick snap coupling for a sensor housing.

BACKGROUND

Automobile air hose assemblies are used to pass air through a primary airflow passage between the engine air filter and the engine. Such a vehicle air hose assembly sometimes includes an intermediate coupling that joins a sensor housing to the primary air hose of the assembly intermediate the ends of the air hose. The airflow coupling provides a secondary airflow passage through a sidewall of the primary air hose and in communication with the primary airflow passage. For example, engine exhaust gases are recirculated into the primary airflow passage leading into the engine via a turbocharger.

The sensor housing typically includes a sensor related to pollution control of the vehicle. To insure the sensor housing is not removed from the intermediate coupling, the sensor housing is typically spin welded to the primary air hose at the intermediate coupling. In this way, the sensor housing and the primary hose are permanently fused together at the intermediate coupling. This prevents unauthorized tampering with the sensor as required by applicable emissions regulations.

There are several disadvantages to the spin welding coupling solution. For example, spin welding requires specific spin welding equipment and a related additional spin welding station and process. As another example, it is necessary that the features being spin welded together are large enough to enable them to be held and spun relative to each other, dictating that these components are relatively large. In addition, the spin welding process often generates small plastic particles that are left inside the primary hose. Because the hose assembly is downstream of the air filter, there is nothing to prevent these particles from the spin welding process being picked up in the airflow and ingested by the turbocharger and engine.

The automobile air hose assembly with a one-way quick snap coupling for a sensor housing described hereinafter has a simple push-on quick connect coupling. No special equipment nor additional complicated process or steps are required. In addition, no plastic residue is generated for the engine to ingest. Further, the size of the components can be provided in a much smaller packaging space. Yet this simple, quick snap coupling is tamper resistant because it is one-way or permanent. In other words, once assembled together, attempted removal of the sensor housing will damage the coupling assembly, providing evidence of such sensor tampering.

SUMMARY

In one aspect of the present disclosure, an automobile air hose assembly with a one-way quick snap coupling for a sensor housing includes an air hose having a side wall defining a primary airflow passage between an air filter end and an opposite engine end. The one-way quick snap coupling joins the sensor housing to the air hose and defines a secondary airflow passage through the side wall of the air hose. The one-way quick snap coupling includes a female annular collar including a plurality of retention lugs resiliently extending therefrom. Each retention lug has a plurality of interior one-way retention teeth. A male annular collar is receivable within the female annular collar and the male annular collar includes a plurality of exterior one-way retention teeth. The interior and exterior one-way retention teeth have cooperating leading surfaces that are angled to engage and slide past each other in an insertion direction. In addition, the interior and exterior one-way retention teeth have cooperating trailing surfaces that are angled to engage each other in a removal direction and prevent the sensor housing from being uncoupled from the air hose without damaging the one-way quick snap coupling.

In another aspect of the present disclosure, the female annular collar extends from the side wall intermediate the air filter and engine ends of the air hose, and the male annular collar extends from the sensor housing.

In another aspect of the present disclosure, the female annular collar includes an inner annular molded plastic component with exterior locking surfaces and an outer, over-molded annular rubber component with cooperating interior locking surfaces. The inner and outer annular components are fused together into a single integral unit without any gaps between the inner and outer annular components.

In another aspect of the present disclosure, each retention lug resiliently extends interiorly from the female annular collar to bias the interior one-way retention teeth against the exterior one-way retention teeth.

In another aspect of the present disclosure, each retention lug is coupled to an interior annular ledge of the female annular collar via a resilient hinge that is axially positioned between a distal end of each retention lug and the interior one-way retention teeth.

In another aspect of the present disclosure, each retention lug is resiliently hingedly coupled to the female annular collar and each retention lug has a pre-coupling angle relative to a radial plane of the secondary airflow passage that is less than a corresponding coupling angle.

In another aspect of the present disclosure, the cooperating trailing surfaces of the interior and exterior one-way retention teeth extend either parallel to a radial plane of the secondary airflow passage or extend interiorly from, and at an angle relative to, the radial plane and toward a distal end of the male annular collar.

In another aspect of the present disclosure, the plurality of exterior one-way retention teeth each extends around an entire circumference of the male annular collar.

DRAWINGS

The present invention will become more fully understood from the detailed description and the accompanying drawings.

DETAILED DESCRIPTION

Figure 1:
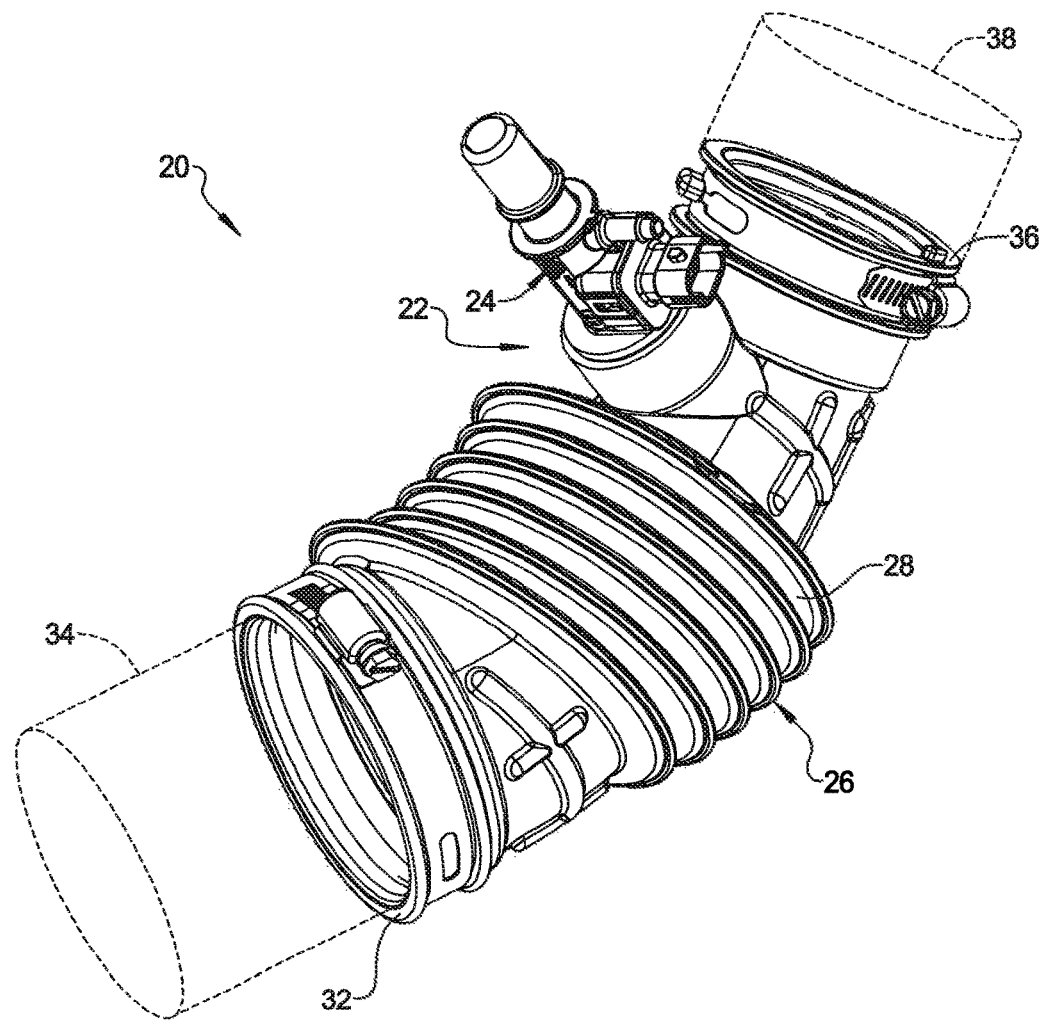
FIG. 1 is a perspective view of one example automobile air hose assembly with a one-way quick snap coupling for a sensor housing in accordance with the present disclosure.
Figure 2:
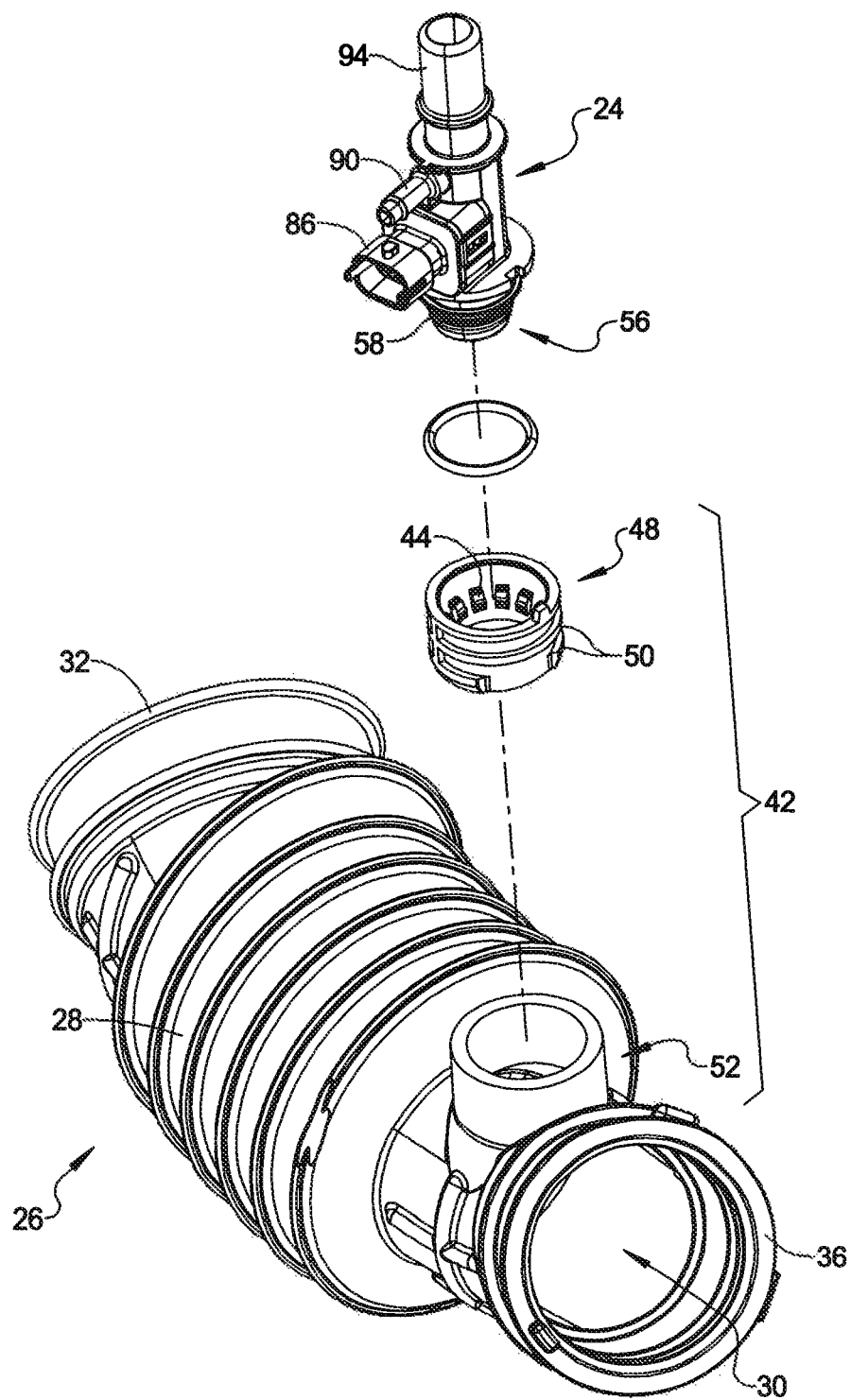
FIG. 2 is an exploded perspective view of the example automobile air hose assembly of FIG. 1.

Further areas of applicability will become apparent from the description, claims and drawings, wherein like reference numerals refer to like features throughout the several views of the drawings. It should be understood that the detailed description, including disclosed embodiments and drawings referenced therein are merely exemplary in nature, intended for purposes of illustration only, and are not intended to limit the scope of the present disclosure.

FIGS. 1-5 shows one example automobile air hose assembly 20 with a one-way quick snap coupling 22 for a sensor housing 24 in accordance with the present disclosure. The air hose assembly 20 includes a primary air hose 26. A side wall 28 of the air hose 26 defines a primary airflow passage 30 between an air filter end 32 and an opposite or engine end 36. The air filter end 32 is directly or indirectly coupled to an air filter 34. The engine end 36 is directly or indirectly coupled to the engine 38, such as to the turbocharger of the engine 38.

The one-way quick snap coupling 22 joins the sensor housing 24 to the air hose 26 and defines a secondary airflow passage 40 through the side wall 28 of the air hose 26. A female annular collar 42 includes a plurality of retention lugs 44 resiliently extending interiorly therefrom. In this example, 12 separate lugs 44 are provided around the internal circumference of the female collar 42. In alternative examples, six, eight, ten or other numbers of lugs 44 are provided. Each retention lug 44 has a plurality of interior one-way retention teeth 46.

Figure 3:
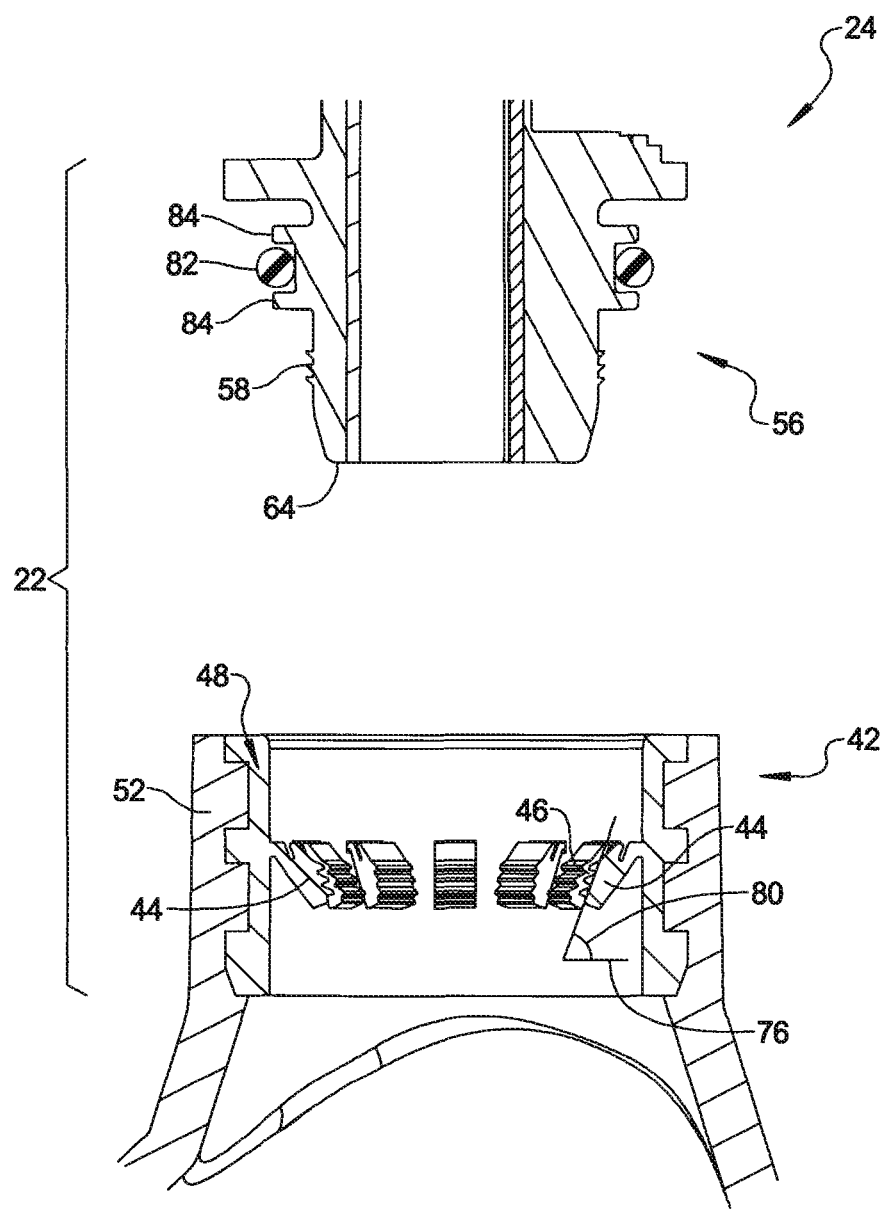
FIG. 3 is a partial exploded cross-section view of the one-way quick snap coupling of the example automobile air hose assembly of FIG. 1.
Figure 4:
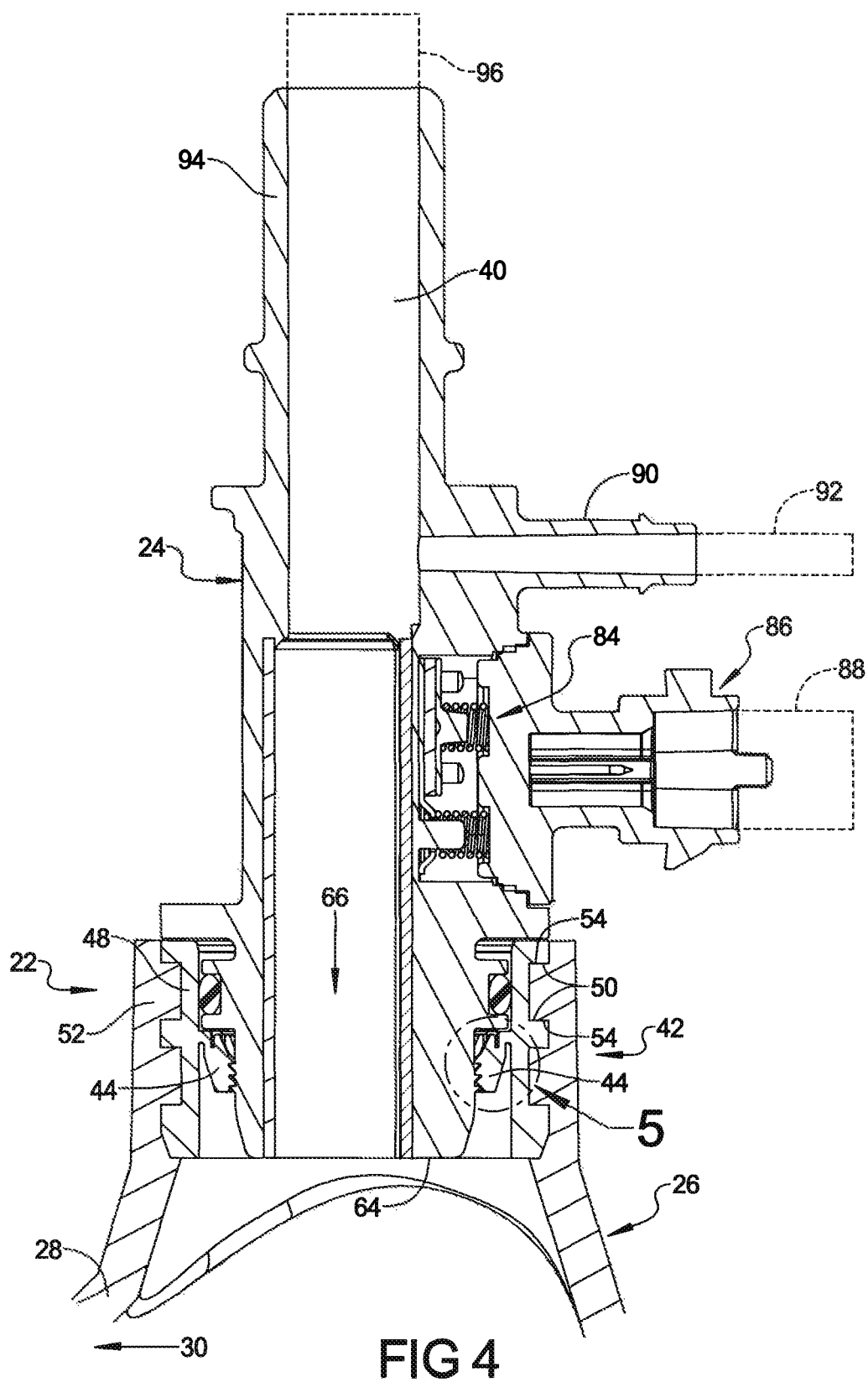
FIG. 4 is a partial cross-sectional view of the one-way quick snap coupling and sensor housing of the example automobile air hose assembly of FIG. 1.
Figure 5:
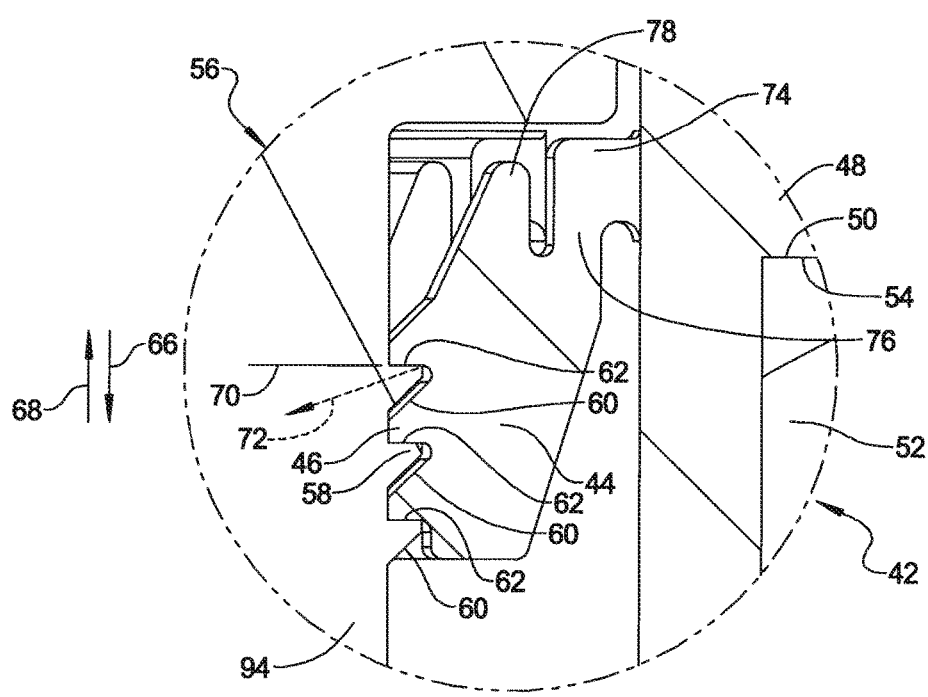
FIG. 5 is an enlarged portion of the cross-sectional view of FIG. 4.

In an aspect, the female annular collar 42 of the primary air hose 26 of this example includes an inner annular molded plastic component 48 with exterior locking surfaces 50. The female annular collar 42 additionally includes an outer annular rubber component 52 with cooperating interior locking surfaces 54 (FIGS. 3 and 4). The more flexible outer rubber component 52 is over-molded around the more rigid inner plastic component 48. The outer rubber component 52 and the inner plastic component 48 are fused together into a single integral unit, which is the female annular collar 42, without any gaps between them.

A male annular collar 56 is specifically designed to be received within and coupled to the female annular collar 42. The male annular collar 56 includes a plurality of exterior one-way retention teeth 58. In an aspect, the plurality of exterior one-way retention teeth 58 are provided as three circumferential ridges that extend around an entire outer circumference of the male annular collar 56.

The interior and exterior one-way retention teeth 46 and 58, respectively, have cooperating leading surfaces 60 that are angled to engage and slide past each other in an axial insertion direction indicated by arrow 66. These teeth 46, 58 additionally have cooperating trailing surfaces 62 that are angled to engage each other in an axial removal direction indicated by arrow 68, which is opposite the axial insertion direction 66. The cooperating trailing surfaces 62 are angled to engage each other to prevent the male annular collar 56 of the sensor housing 24 from being uncoupled from the female annular collar 42 of the air hose 26 without damaging the one-way quick snap coupling 22. This is somewhat similar to the teeth of a zip tie.

In an aspect, when coupled together, the trailing surfaces 62 of the one-way retention teeth 46, 58 either extend parallel to a radial plane 70 (i.e., is normal to the central axis) of the secondary airflow passage 40 or extend interiorly from, and at an angle relative to, the radial plane 70 toward an insertion or distal end 64 of the male annular collar 56 as exemplified by arrow 72. Such an orientation of the trailing surfaces 62 helps insure the cooperating teeth 46, 58 operate only in a one-way insertion direction 66 and cannot be separated by application of a separating force in an opposite, removal direction 68 without damaging the teeth 46, 58 or other parts of the joined air hose 26 and sensor housing 24.

Each retention lug 44 is coupled to an interior annular ledge 74 of the female annular collar 42 via a resilient hinge 76 that is axially positioned between a distal end 78 of each retention lug 44 and the interior one-way retention teeth 46 of the lug 44. The hinges 76 are resilient hinges 76 that couple the retention lugs 44 to the female annular collar 42. Each retention lug 44 has a pre-coupling angle 80 (FIG. 3) relative to a radial plane 76 of the secondary airflow passage 40 that is less than the corresponding angle when coupled, or coupling angle (FIG. 4). In addition, each retention lug 44 resiliently extends interiorly from the female annular collar 42 to bias the interior one-way retention teeth 46 against the exterior one-way retention teeth 58 of the male annular collar 56.

An O-ring 82 is positioned and held between two annular flanges 84 of the sensor housing 24. The O-ring 82 provides an airtight seal between the male and female annular collars 56 and 42, respectively. The sensor housing 24 additionally includes a sensor coupling collar 90 for coupling the secondary airflow passage 40 to the EGR sensor 92. A secondary airflow coupling 94 is provided for coupling the secondary airflow passage 40 to the EGR secondary airflow source 96. A heater assembly 84 and a heater coupling collar 86 are also provided for coupling the heater assembly 84 to the heater power source 88.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An automobile air hose assembly with a one-way quick snap coupling for a sensor housing comprising:

an air hose having a side wall defining a primary airflow passage between an air filter end and an opposite, engine end;

the one-way quick snap coupling joins the sensor housing to the air hose and defining a secondary airflow passage through the side wall of the air hose and comprising:

a female annular collar including a plurality of retention lugs resiliently extending interiorly from the female annular collar, each retention lug having a plurality of interior one-way retention teeth extending interiorly from each retention lug;

a male annular collar receivable within the female annular collar and the male annular collar including a plurality of exterior one-way retention teeth;

wherein the interior and exterior one-way retention teeth have cooperating leading surfaces that are angled to engage and slide past each other in an insertion direction, and have cooperating trailing surfaces that are angled to engage each other in a removal direction and prevent the sensor housing from being uncoupled from the air hose without damaging the one-way quick snap coupling.

2. The automobile air hose assembly of claim 1, wherein the female annular collar extends from the side wall intermediate the air filter and engine ends of the air hose, and the male annular collar extends from the sensor housing.

3. The automobile air hose assembly of claim 1, wherein the female annular collar comprises an inner annular molded plastic component with exterior locking surfaces and an outer, over-molded annular rubber component with cooperating interior locking surfaces, and wherein the inner and outer annular components are fused together into a single integral unit without any gaps between the inner and outer annular components.

4. The automobile air hose assembly of claim 1, wherein each retention lug resiliently extends interiorly from the female annular collar to bias the interior one-way retention teeth against the exterior one-way retention teeth.

5. The automobile air hose assembly of claim 1, wherein each retention lug is coupled to an interior annular ledge of the female annular collar via a resilient hinge that is axially positioned between a distal end of each retention lug and the interior one-way retention teeth.

6. The automobile air hose assembly of claim 1, wherein each retention lug is resiliently hingedly coupled to the female annular collar and each retention lug has a pre-coupling angle relative to a radial plane of the secondary airflow passage that is less than a corresponding coupling angle.

7. The automobile air hose assembly of claim 1, wherein the cooperating trailing surfaces of the interior and exterior one-way retention teeth extend either parallel to a radial plane of the secondary airflow passage or extend interiorly from, and at an angle relative to, the radial plane and toward a distal end of the male annular collar.

8. The automobile air hose assembly of claim 1, wherein the plurality of exterior one-way retention teeth each extends around an entire circumference of the male annular collar.

* * * * *